US008850133B1

United States Patent
Mandic et al.

(10) Patent No.: US 8,850,133 B1
(45) Date of Patent: Sep. 30, 2014

(54) USING DYNAMIC BLOCK SIZES IN DATA TRANSFER OPERATIONS

(75) Inventors: Vladimir Mandic, San Jose, CA (US); Vijay C. Madhavapeddi, Sunnyvale, CA (US)

(73) Assignee: EMC Corporation, Hopkinton, MA (US)

( * ) Notice: Subject to any disclaimer, the term of this patent is extended or adjusted under 35 U.S.C. 154(b) by 51 days.

(21) Appl. No.: 13/332,291

(22) Filed: Dec. 20, 2011

(51) Int. Cl.
*G06F 13/00* (2006.01)

(52) U.S. Cl.
USPC .......................................... 711/154; 711/173

(58) Field of Classification Search
CPC combination set(s) only.
See application file for complete search history.

(56) References Cited

U.S. PATENT DOCUMENTS

| | | | | |
|---|---|---|---|---|
| 5,727,002 | A | * | 3/1998 | Miller et al. .................. 714/748 |
| 6,557,055 | B1 | * | 4/2003 | Wiese ............................. 710/36 |
| 2004/0236924 | A1 | * | 11/2004 | Johnson et al. ................ 711/173 |
| 2009/0245104 | A1 | * | 10/2009 | Nishimura et al. ........... 370/230 |
| 2011/0258378 | A1 | * | 10/2011 | Ananthanarayanan et al. ............................ 711/114 |

* cited by examiner

*Primary Examiner* — Charles Rones
*Assistant Examiner* — Han Doan
(74) *Attorney, Agent, or Firm* — Van Pelt, Yi & James LLP

(57) ABSTRACT

Dynamically adjusting a block size in a data transfer operation is disclosed. An indication that a data transfer operation has commenced is received. A first portion of data is read using a first read block size. A first throughput associated with the first read block size is determined. A second portion of data that is different from the first portion of data is read using a second block size that is different from the first read block size. One of the first and second read block sizes is used to complete the data transfer operation based on a comparison of the first throughput and a throughput of the second read block size. This process can be repeated several times as necessary.

20 Claims, 3 Drawing Sheets

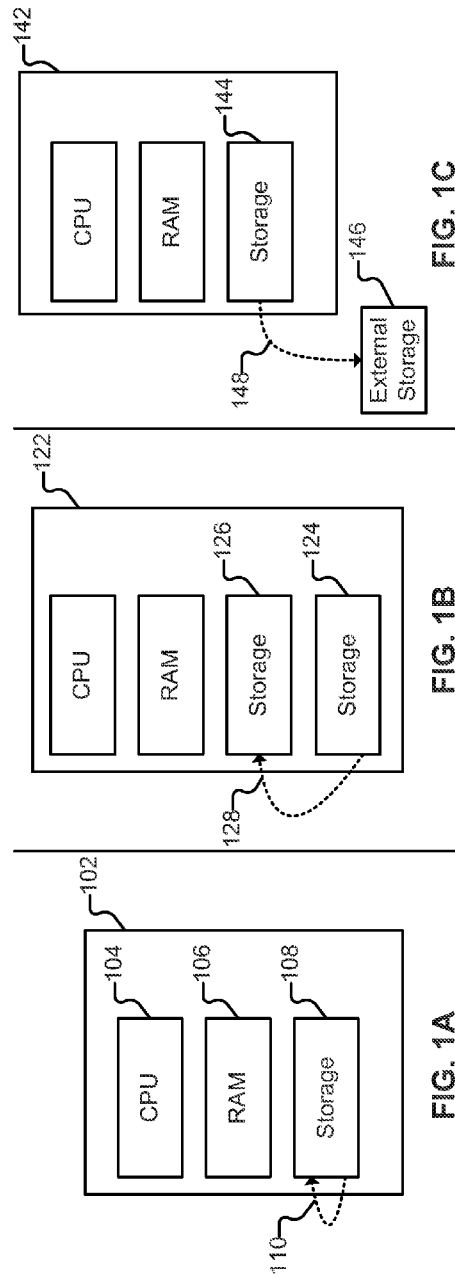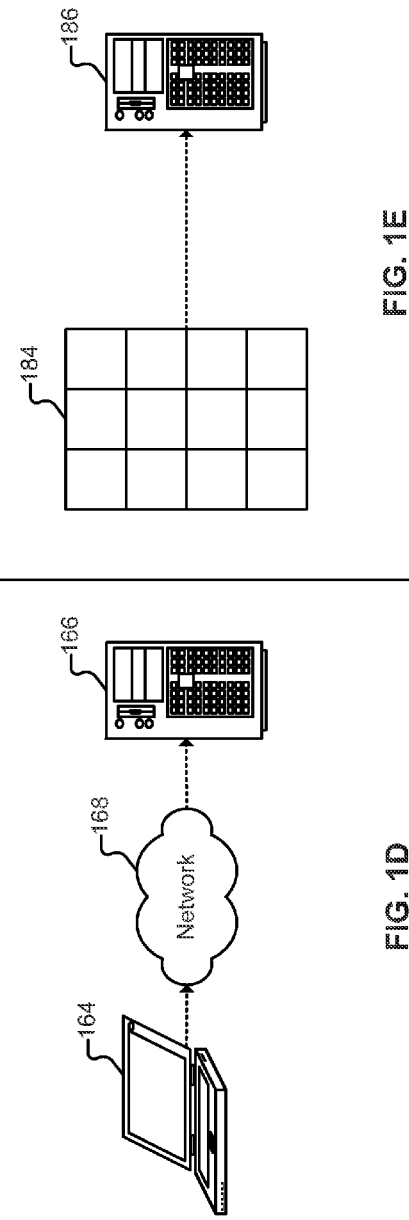

USING DYNAMIC BLOCK SIZES IN DATA TRANSFER OPERATIONS

BACKGROUND OF THE INVENTION

Data transfer operations have traditionally made use of fixed, predetermined values for read block sizes that are specified, for example, by the underlying operating system or application performing the data transfer operation. Unfortunately, a single default setting is unlikely to be an optimal value in all environments.

BRIEF DESCRIPTION OF THE DRAWINGS

Various embodiments of the invention are disclosed in the following detailed description and the accompanying drawings.

FIG. 1A illustrates an embodiment of an environment in which a data transfer operation is performed.

FIG. 1B illustrates an embodiment of an environment in which a data transfer operation is performed.

FIG. 1C illustrates an embodiment of an environment in which a data transfer operation is performed.

FIG. 1D illustrates an embodiment of an environment in which a data transfer operation is performed.

FIG. 1E illustrates an embodiment of an environment in which a data transfer operation is performed.

DETAILED DESCRIPTION

Figure 2:
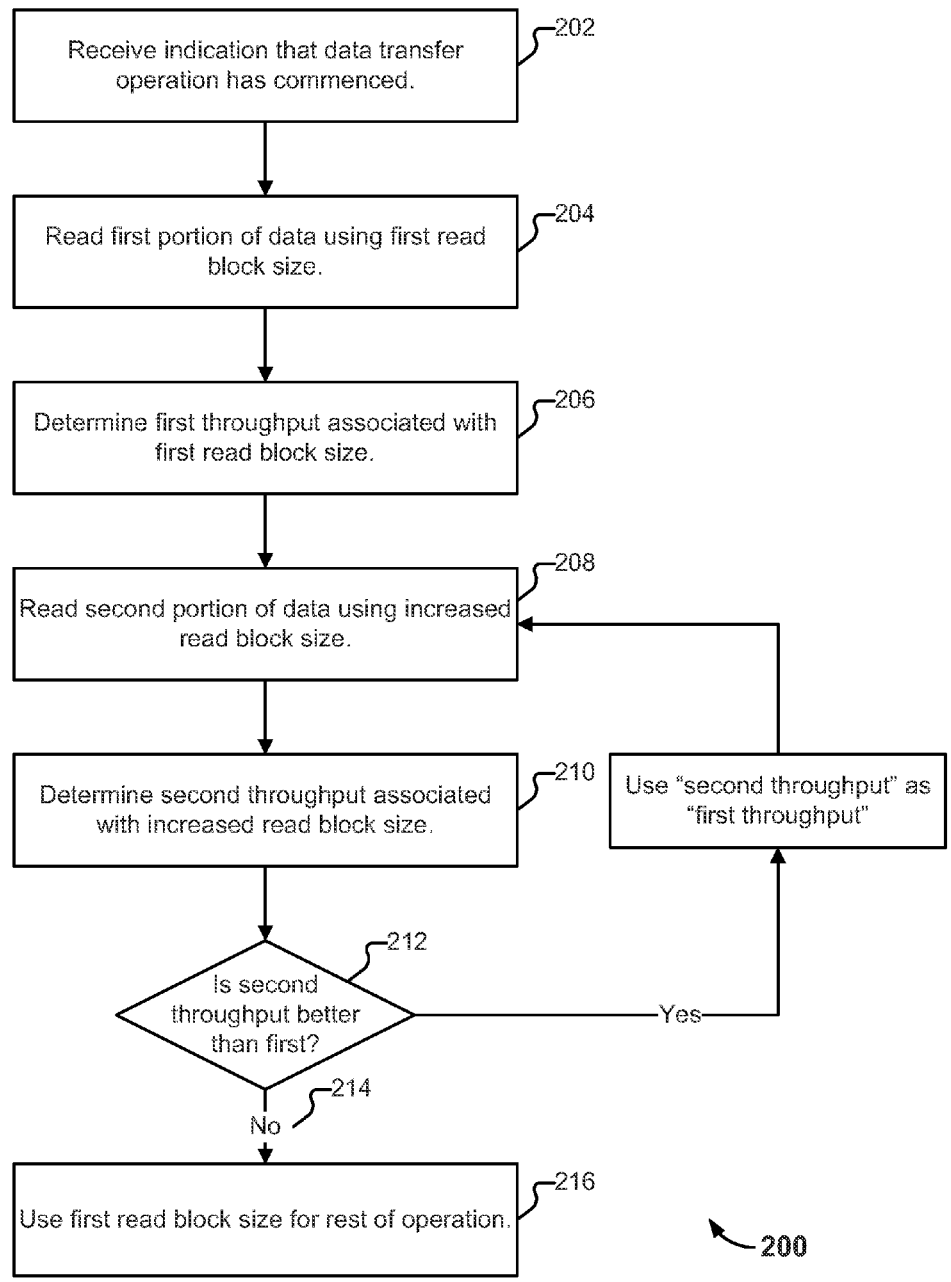
FIG. 2 illustrates an embodiment of a process for dynamically adjusting a block size in a data transfer operation.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIGS. 1A-1E illustrate examples of various environments in which data transfer operations are performed. Examples of data transfer operations include the reading and/or writing of data, such as by a backup application, or as initiated by a user executing file transfer commands. As will be described in more detail below, dynamically determined and/or adjusted block sizes (e.g., read block sizes and/or write block sizes) can be used in such data transfer operations to improve resource utilization. The dynamic adjustment can be performed without the introduction of appreciable overhead and without knowledge of the underlying system, such as by adjusting the block size based on empirical analysis and reading a given portion of data only once per operation.

FIG. 1A depicts a computer system that includes commodity components such as a CPU 104, RAM 106, and an internal physical storage 108. In the example shown in FIG. 1A, storage 108 is a hard disk drive (HDD). Other types of physical storage can also be used in embodiments of system 102, such as a solid-state drive (SSD). System 102 includes a backup application which, when executed, duplicates data stored in storage 108 (indicated by line 110). As one example, suppose storage 108 is partitioned into two logical drives—a c:\ drive and a d:\ drive. When a backup is initiated, data is copied from the c:\ drive to the d:\ drive. In the example shown in FIG. 1A, system 102 is both the source system and the target system, with drive c:\ serving as the source drive, and drive d:\ serving as the target drive. The data can be transferred using file-based reads/writes and can also be transferred using volume-based reads/writes.

Computer system 122 depicted in FIG. 1B is similar to computer system 102, except that it includes two internal physical storage devices—storage 124 and storage 126. Storage 124 and storage 126 can be of the same type (e.g., both being HDDs) and can also be of mixed types in various embodiments. Storage 124 and 126 may similarly have the same technical specifications (e.g., capacities and speeds) or may have different specifications. When a backup program is executed on system 122, data is copied (128) from storage 124 (the source) to storage 126 (the target). Data can also be copied within a single storage (as occurs in system 102) as applicable.

Computer system 142 depicted in FIG. 1C includes at least one internal physical storage device 144 and one external storage device 146. As with system 122, the storage devices in computer system 142 can be homogenous or heterogeneous. For example, in various embodiments external storage 146 is a tape storage system or optical disc drive, coupled to or otherwise in communication with internal storage 144. When a backup application is executed on system 122, data is copied (148) from internal storage 144 to external storage 146. Copying can also be performed from external storage 146 to internal storage 144 as part of a backup process, as applicable.

In the environment shown in FIG. 1D, data is copied from one platform 164 to another platform 166 via one or more network(s) 168. The platforms may be but need not be identical. For example, in some embodiments both platforms 164 and 166 are commodity computers. In other embodiments, platform 164 is a commodity notebook computer, while platform 166 is a cloud-based virtual "server" implemented as a scalable, elastic architecture and may comprise several distributed components, including components provided by one or more third parties. Further, platforms 164 and 166 can be connected via a variety of network types, such as one or more local area networks (LANs), wide area networks (WANs), and storage area networks (SANs).

In the environment shown in FIG. 1E, data is copied from a source disk array 184 to a target computer system 186 (or vice versa). In the example shown in FIG. 1E, array 184 includes twelve HDDs arranged into two logical unit numbers (LUNs) comprising five disks each, with two spare disks. A variety of technologies can be used to connect array 184 to a host 186, including Small Computer System Interface (SCSI) and Internet Protocol (IP). Similarly, the connection between array 184 and target 186 can be of any appropriate type, including Fibre Channel (FC) and serial connections.

As illustrated in the examples shown in FIGS. 1A-1E, data transfer operations can occur in a wide variety of environments. Characteristics of the source system, as well as its operating system and volume management layers can have a significant impact on the optimal size of that system's read block size. Selecting an appropriate read block size in turn can have a significant impact on disk read performance and thus overall data transfer performance. A single default value (e.g., 32 KB) used as the read size for each of the source systems shown in FIGS. 1A-1E is likely to be sub-optimal in at least some of those environments. For example, using a read size of 8M with array 184 may be optimal, while a read size of 128 KB may be most appropriate for system 102. By dynamically adjusting the read block size, read performance, and thus overall data transfer performance is maximized. Further, since the dynamic adjustment is performed based on empirical analysis, technical details about the participants in the data transfer operation (such as the particular brand of HDD employed or controller used) are not needed.

FIG. 2 illustrates an embodiment of a process for dynamically adjusting a block size in a data transfer operation. In various embodiments, process 200 is performed on a target system, such as platform 164. The process begins at 202 when an indication that a data transfer operation has commenced is received. As one example, such an indication is received when an application on platform 164 initiates a backup operation during which data from device 164 is to be backed up to platform 166. In some embodiments, the backup is initiated remotely (e.g., platform 166 instructs platform 164 to begin the backup operation).

At 204, a first portion of data is read using a first read block size. As one example, suppose platform 164 is configured to perform a volume-based copy of data to platform 166. Platform 164 begins reading a first chunk of data at a default read block size. As one example, the first read block size is of size $2^m$ KB, such as a size of $2^5$=32 KB.

At 206, a first throughput is determined for the data read at 204, such as 10 ms/KB. A variety of techniques can be used to determine the throughput. For example, a "time" command provided by the operating system of platform 164 can be employed to time how long a read takes. As another example, the number of CPU cycles that occur during the read can be counted and used to determine a throughput. In some embodiments, several portions of data are read using the first read block size and the throughput computed at 206 is an average across those multiple reads. Instead of reading the same data multiple times, the read progresses forward.

When the analysis performed at 206 is performed using reads of multiple portions of data, the total amount of data read is aligned to a power of two, in some embodiments. Alignment with a power of two is maintained, even if multiple reads are not included in the throughput determination. For example, if fewer than $2^n$ blocks of size 32 KB have been read, prior to progressing to testing a 64 KB block size, a few more blocks of size 32 KB will be read to ensure an offset of $2^n$ from the starting position (e.g., of the file, disk, RAID, etc.). As an example, if five blocks of size 32 KB have been read, the current offset is 160 KB from the starting location. Three more 32 KB blocks are read to reach 256 KB (5+3=8=$2^n$) before using a read size of 64 KB blocks.

At 208, a second portion of data is read using a second read block size, such as a block size of size $2^{m+1}$ (i.e., $2^6$=64 KB to continue the previous example). As with the processing performed at 206, a throughput associated with the second read block size is determined at 210 (e.g., 8 ms/KB). Alignment with a power of two is maintained.

At 212, the first and second throughputs are compared. If the second throughput (8 ms/KB) is better than the first throughput (10 ms/KB), portions 208 and 210 of the process are repeated, using a third read block size, such as $2^{m+2}$ (i.e., $2^7$=128 KB). Portions 208-212 of process 200 are repeated until performance drops (214), at which point the best observed read block size will be used to complete the remainder of the data transfer operation (216). In some embodiments, read block size testing (i.e., 204-212) is repeated multiple times during the data transfer operation instead of being performed a single time. For example, if the operation is scheduled to last several hours, retuning the read block sizes can be performed. Also, in some embodiments, a maximum read size (e.g., 8 MB) is enforced against increases that occur as a result of multiple iterations of portions 208-212 of process 200. The buffer allocated to perform writes is at least as large as the maximum read size (e.g., 8 MB).

Figure 3:
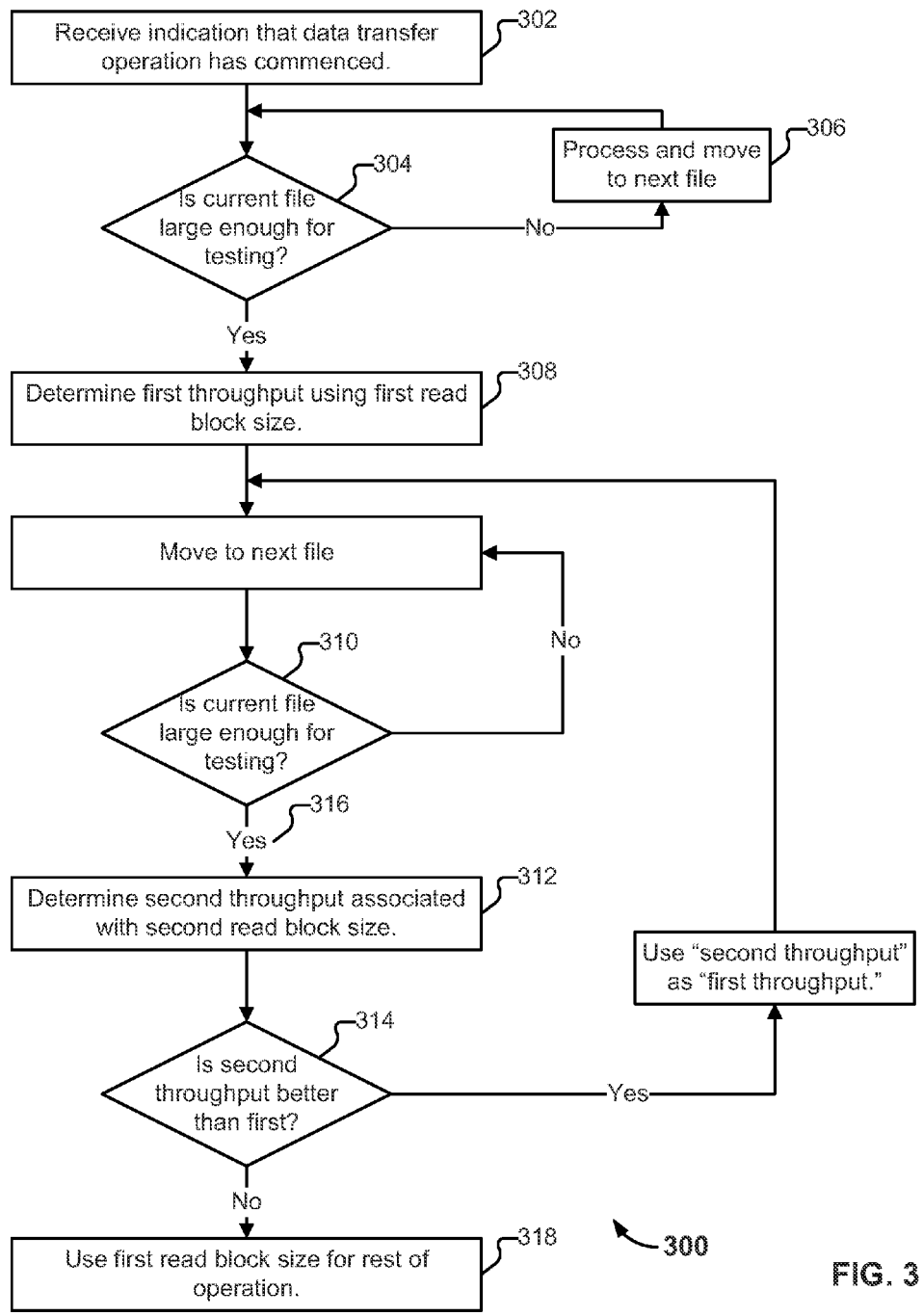
FIG. 3 illustrates an embodiment of a process for dynamically adjusting a block size in a data transfer operation.

FIG. 3 illustrates an embodiment of a process for dynamically adjusting a block size in a data transfer operation. In various embodiments, process 300 is performed on a target system, such as computer system 142. The process begins at 302 when an indication that a data transfer operation has commenced is received. As one example, such an indication is received at 302 when a nightly backup job is automatically started on system 142. The backup job is configured to copy all files present in a directory of storage 144 to external storage 146, as a file-by-file transfer. Initially, the backup job reads files on storage 144 using a default read block size (e.g., $2^5$=32 KB).

While the data transfer operation is underway, process 300 examines the sizes of the files being processed (304). If the file is too small (e.g., less than the current read block size), the file is handled by the backup application normally (306). Once a file of sufficiently large size is encountered, a throughput for the current read block size is determined at 308 (e.g., as per 206 of process 200). As one example, a file can be deemed of sufficient size for testing if it is at least of size $2^{n+1}$, where $2^n$ is the maximum size to which the read size can be increased (e.g., n=8M as explained above). In some embodiments, the required file size adjusts based on the current read size. For example, read sizes up to $2^7$=128 KB may each require a file of at least 10M in size for testing, while larger read sizes may each require a file of at least 100M in size for testing.

When a second file of suitable size is encountered (316), a second throughput associated with a second read block size is determined (312) (e.g., as per 210 of process 200). In some embodiments what constitutes a suitable size is updated to reflect the current read block size. Thus, if the read block size was $2^5$ at 308 (and the file size needed at 304 was $2^6$), the read block size at 312 will be $2^6$ (and the file size needed at 310 will be $2^7$).

At 314, the first and second throughputs are compared. If the second throughput is better than the first throughput, portions of the process are repeated, with the read sizes increasing as powers of two each time. Portions 310-314 of process 300 are repeated until performance drops (318) or a maximum read size is reached. The appropriate read size will then be used for the remainder of the transfer operation (e.g., the rest of the evening's backup). In various embodiments, process 300 is performed each time the nightly backup runs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
cause a first portion of data to be read using a first read block size;
determine a first throughput associated with the first read block size;
cause a second portion of data that is different from the first portion of data to be read using a second read block size that is different from the first read block size, wherein the second portion of data is read using the second read block size beginning at a first offset that is aligned to a power of 2 from a starting position of the data; and
select, based at least in part on a comparison of the first throughput and a second throughput associated with the second read block size, one of the first and second read block sizes to use to complete the data transfer operation; and
a memory coupled to the processor and configured to provide the processor with instructions;
wherein determining a first throughput includes reading a third portion of data using the first read block size and calculating an average; and
wherein the processor is further configured to read a sufficient number of blocks using the first read block size such that an amount of data read using the first read block size is aligned to a power of 2.

2. The system of claim 1 wherein the first portion of data and the second portion of data are each only read once, respectively, during the data transfer operation.

3. The system of claim 1 wherein the first and second read block sizes are powers of 2.

4. The system of claim 1 wherein the data transfer operation comprises a data backup operation.

5. The system of claim 1 wherein the data transfer operation comprises a transfer of one or more files.

6. The system of claim 5 wherein the processor is further configured to determine whether a file is of at least a threshold size prior to using the file to determine the first throughput.

7. The system of claim 1 wherein the data transfer operation comprises a transfer of one or more blocks of data.

8. The system of claim 1 wherein the processor is further configured to read a third portion of data using a third read block size.

9. The system of claim 8 wherein the third portion of data is read using the third read block size beginning at a second offset that is aligned to a power of 2 from the starting position of the data.

10. The system of claim 1 wherein the starting position of the data comprises a starting position associated with one of the following: a file, a disk, and a RAID.

11. A method, comprising:
receiving an indication that a data transfer operation has commenced;
reading a first portion of data using a first read block size;
determining a first throughput associated with the first read block size;
reading a second portion of data that is different from the first portion of data, using a second read block size that is different from the first read block size, wherein the second portion of data is read using the second read block size beginning at a first offset that is aligned to a power of 2 from a starting position of the data; and
selecting, based at least in part on a comparison of the first throughput and a second throughput associated with the second read block size, one of the first and second read block sizes to complete the data transfer operation;
wherein determining a first throughput includes reading a third portion of data using the first read block size and calculating an average; and
wherein a sufficient number of blocks are read using the first read block size such that an amount of data read using the first read block size is aligned to a power of 2.

12. The method of claim 11 wherein the first portion of data and the second portion of data are each only read once, respectively, during the data transfer operation.

13. The method of claim 11 wherein the first and second read block sizes are powers of 2.

14. The method of claim 11 wherein the data transfer operation comprises a data backup operation.

15. The method of claim 11 wherein the data transfer operation comprises a transfer of one or more files.

16. The method of claim 11 wherein the data transfer operation comprises a transfer of one or more blocks of data.

17. The method of claim 11 further comprising reading a third portion of data using a third read block size.

18. The method of claim 17 wherein the third portion of data is read using the third read block size beginning at a second offset that is aligned to a power of 2 from the starting position of the data.

19. The method of claim 11 wherein the starting position of the data comprises a starting position associated with one of the following: a file, a disk, and a RAID.

20. A computer program product embodied in a non-transitory computer readable medium and comprising computer instructions for:
receiving an indication that a data transfer operation has commenced;
reading a first portion of data using a first read block size;
determining a first throughput associated with the first read block size;
reading a second portion of data that is different from the first portion of data, using a second read block size that is different from the first read block size, wherein the second portion of data is read using the second read block size beginning at a first offset that is aligned to a power of 2 from a starting position of the data; and
selecting, based at least in part on a comparison of the first throughput and a second throughput associated with the second read block size, one of the first and second read block sizes to complete the data transfer operation;
wherein determining a first throughput includes reading a third portion of data using the first read block size and calculating an average; and
wherein the processor is further configured to read a sufficient number of blocks using the first read block size such that an amount of data read using the first read block size is aligned to a power of 2.

* * * * *